United States Patent [19]

Gehringer

[11] Patent Number: 5,242,670
[45] Date of Patent: Sep. 7, 1993

[54] METHOD FOR HYDROFLUORIC ACID DIGESTION OF SILICA/ALUMINA MATRIX MATERIAL FOR THE PRODUCTION OF SILICON TETRAFLUORIDE, ALUMINUM FLUORIDE AND OTHER RESIDUAL METAL FLUORIDES AND OXIDES

[76] Inventor: Ronald C. Gehringer, 239 E. Main St., Cary, Ill. 60013

[21] Appl. No.: 907,854

[22] Filed: Jul. 2, 1992

[51] Int. Cl.⁵ .............................................. C01B 33/08
[52] U.S. Cl. ...................................... 423/342; 423/116; 423/131; 423/343; 423/341
[58] Field of Search ............... 423/111, 116, 131, 341, 423/342, 343

[56] References Cited

U.S. PATENT DOCUMENTS

| | | | |
|---|---|---|---|
| 3,551,098 | 12/1970 | Flemmert | 423/343 |
| 3,961,030 | 6/1976 | Wiewiorowski et al. | 423/126 |
| 4,069,296 | 1/1978 | Huang | 423/127 |
| 4,206,189 | 6/1980 | Kosintsev et al. | 423/336 |
| 4,382,071 | 5/1983 | Otsuka et al. | 423/341 |
| 4,442,082 | 4/1984 | Sanjurjo | 423/350 |
| 4,470,959 | 9/1984 | Talwar et al. | 423/341 |
| 4,539,187 | 9/1985 | Russ et al. | 423/132 |
| 4,560,540 | 12/1985 | Berglund | 423/116 |
| 4,615,872 | 10/1986 | Porcham | 423/341 |
| 4,900,530 | 2/1990 | Anania et al. | 423/342 |

OTHER PUBLICATIONS

Sanjuro et al, *Silicon by Sodium Reduction of Silicon Tetrafluoride*, Journal of the Electrochemical Society, vol. 128, No. 1, Jan. 1981, pp. 179-184.

*Primary Examiner*—Olik Chaudhuri
*Assistant Examiner*—Ken Horton
*Attorney, Agent, or Firm*—James P. Hanrath

[57] ABSTRACT

A process for hydrofluoric acid digestion of inorganic silica/alumina matrix material for the production of silicon tetrafluoride and aluminum fluoride comprises the initial step of reacting the matrix material with hydrofluoric acid, to form silicon tetrafluoride gas and a solution/slurry containing aluminum fluoride, undigested oxides, and additional soluble and insoluble fluoride materials. The silicon tetrafluoride gas is purified of contaminants by condensing out impurities in cold traps and reacted with aqueous sodium fluoride to form a solution/slurry of fluorosilicate salt which is delivered to a filter press to separate sodium fluorosilicate powder from the solution/slurry. The sodium fluorosilicate powder is dried and delivered to a kiln at a temperature of about 600° C. to 650° C. to form substantially pure silicon tetrafluoride gas and sodium fluoride powder for collection. Recovery of aluminum fluoride is obtained by washing the solution/slurry containing aluminum fluoride, undigested oxides and additional soluble and insoluble fluoride materials with water to completely dissolve all water soluble materials; separating all undissolved materials by a filter press and drying the remaining solution containing aluminum fluoride and other water soluble fluorides in an evaporator while condensing water and excess hydrofluoric acid vapors in a condenser; recovering the aluminum fluoride or heavy metal fluorides from the dried solution and/or collecting high purity hydrofluoric acid from the liquid condensate by fractional distillation.

13 Claims, 3 Drawing Sheets

METHOD FOR HYDROFLUORIC ACID DIGESTION OF SILICA/ALUMINA MATRIX MATERIAL FOR THE PRODUCTION OF SILICON TETRAFLUORIDE, ALUMINUM FLUORIDE AND OTHER RESIDUAL METAL FLUORIDES AND OXIDES

BACKGROUND OF THE INVENTION

1. Field of the Invention

The present invention relates to a method for hydrofluoric acid digestion of silica/alumina matrix material for the production of silicon tetrafluoride, aluminum fluoride and other residual metal fluorides and oxides 2. Description of the Related Art Including Information Disclosed Under 37 CFR §1.97–1.99

Currently large quantities of silica/alumina ($SiO_2$/$Al_2O_3$) matrix waste material is produced by a number of commercial industries including, but not limited to, the spent fluid cracking catalyst unit (FCCU) materials, e.g. silica/alumina zeolytes, from the petroleum industry and the coal combustion by-products (CCBP), e.g. fly ash, slags, or bottom ash, produced from the use of fossil fuels by the power generation industry. The present invention relates to hydrofluoric acid digestion of these silica/alumina matrix material for the production of useful material including silicon tetrafluoride (also called tetrafluorosilane, $SiF_4$), aluminum fluoride (also called aluminum trifluoride, $AlF_3$) and other residual metal fluorides and oxides.

Silicon tetraflouride is an important intermediate, useful for the production of valuable products, such as pure silica, silanes, pure silicon for solar cells, silicon nitride for ceramic products, amorphous silicon for photo-voltaic cells, and etching medium for materials containing silicon in the semi conductor industry, and fluorinated carbo-silicon polymers for materials for architectural uses. Further, silicon tetrafluoride may be used to produce hydrogen fluoride and silicon dioxide. For example, U.S. Pat. No. 4,206,189 discloses a method wherein silicon tetrafluoride is subjected to water hydrolysis in the presence of sulfuric acid to produce hydrogen fluoride and silicon dioxide. Hydrogen fluoride is used in production of such important chemicals as organofluorine compounds (fluorinated plastics, freons, etc.), inorganic fluorides (cryolites, sodium and aluminum fluorides) for aluminum production, fluoride optical materials, oxidants for rocket engineering, fluoride inorganic compounds for atomic engineering, etc.. Silicon dioxide is used in the technical rubber industry as a filler for rubber stocks and as a raw material in the optical, radio engineering, electronic glassmaking, and other industries. It is the main component in compositions for manufacturing luminophores, sorbents for chromatography, etc.

Aluminum fluoride is useful as a precursor for making an oxide etchant for electronic applications and may also be useful as an ammonium source for diammonium phosphate.

In U.S. Pat. No. 4,615,872 a process for producing silicon tetrafluoride by hydrolysis of gases containing silicon fluoride is disclosed wherein the hydrolysate is reacted with sodium fluoride, potassium fluoride or barium fluoride and the reaction product obtained is decomposed thermally, thereby forming silicon tetrafluoride.

In U.S. Pat. No. 4,900,530 a process for the production of silicon tetrafluoride is disclosed starting from an aqueous solution of fluorosilicic acid that is reacted with concentrated sulfuric acid followed by a separating of the gaseous stream containing silicon tetrafluoride from a liquid stream of aqueous sulfuric acid. The gaseous stream is then washed with concentrated and cold sulfuric acid for the purpose of separating a gaseous stream of purified silicon tetrafluoride which may also be subjected to further purification process by means of techniques of absorption on an absorbent solid material.

In U.S. Pat. No. 4,470,959 silicon tetrafluoride gas is produced by reacting aqueous fluorosilicic acid and concentrated sulfuric acid in a vertical column.

In U.S. Pat. No. 3,961,030 an aluminum containing ore is treated with a fluorine acid such as hydrofluoric acid or fluorosilicic acid to produce aluminum fluoride which is recovered from the liquid phase of the reaction mixture by crystallization as $AlF_3 \cdot 3H_2O$ crystals which are then dried and dehydrated to yield aluminum fluoride which may be pyrohydrolyzed to produce alumina and hydrofluoric acid.

The disclosure herein is directed to a process for hydrofluoric acid digestion of silica/alumina matrix material for the production of silicon tetrafluoride, aluminum fluoride, and other heavy metals. This process is advantageous over the prior art in that it allows for the chemical digestion of a silicon/alumina matrix material which is of lower grade and often man-made such as spent fluid cracking catalyst unit (FCCU) materials and coal combustion by-products (CCBP) as opposed to naturally occurring high purity clays. Additionally, the initial chemical digestion of the silica/alumina matrix material is worked at ambient temperature and, although the exothermic nature of the initial reaction will heat the solution, the temperature remains under 100° C. to prevent water vapor from being in admixture to the produced silicon tetrafluoride gas stream. Additionally, the silicon tetrafluoride gas stream is further purified by introducing the same through one or more, and preferably a series of, cold trap(s) to liquify or crystalize impurities out of the silicon tetrafluoride gas stream which may destroy or hamper electrical application of the final silicon metal.

SUMMARY OF THE INVENTION

According to the present invention there is provided a process for hydrofluoric acid digestion of inorganic silica/alumina matrix material for the production of silicon tetrafluoride and aluminum fluoride which comprises the initial step of reacting the matrix material with hydrofluoric acid, at a 0 to about 10% stoichiometric excess of acid, to produce silicon tetrafluoride gas and a solution/slurry containing aluminum fluoride, undigested oxides and additional soluble and insoluble fluoride materials. The silicon tetrafluoride gas is purified by condensation of contaminants in cold traps and then reacted with aqueous sodium fluoride in excess hydrogen fluoride to form a slightly soluble solution/slurry of sodium fluorosilicate salt which is delivered to a filter press to separate sodium fluorosilicate powder from the solution. The sodium fluorosilicate powder is dried and then delivered to a kiln set at a temperature of about 600° C. to 650° C. to separate substantially pure silicon tetrafluoride gas and sodium fluoride powder for collection. The process also provides for recovery of aluminum fluoride by washing the solution/slurry containing aluminum fluoride, undigested oxides, and additional soluble and insoluble fluoride materials with water to completely dissolve all water soluble materials; separating all undissolved materials by a filter press and drying the remaining solution containing aluminum fluoride and other water soluble fluorides in an evaporator while condensing water and residual excess hydrofluoric acid vapors in a condenser; and recovering the aluminum fluoride or heavy metal fluorides from the dried solution and/or collecting high purity hydrofluoric acid from the liquid condensate by fractional distillation.

BRIEF DESCRIPTION OF THE DRAWINGS

The Figures are a schematic diagram of the hydrofluoric acid digestion of a silica/alumina matrix for the production of silicon tetrafluoride, aluminum fluoride and other residual metal fluorides and oxides according to the present invention, consisting of three drawings, namely FIG. 1, 2, and 3.

DESCRIPTION OF THE PREFERRED EMBODIMENTS

Figure 1:
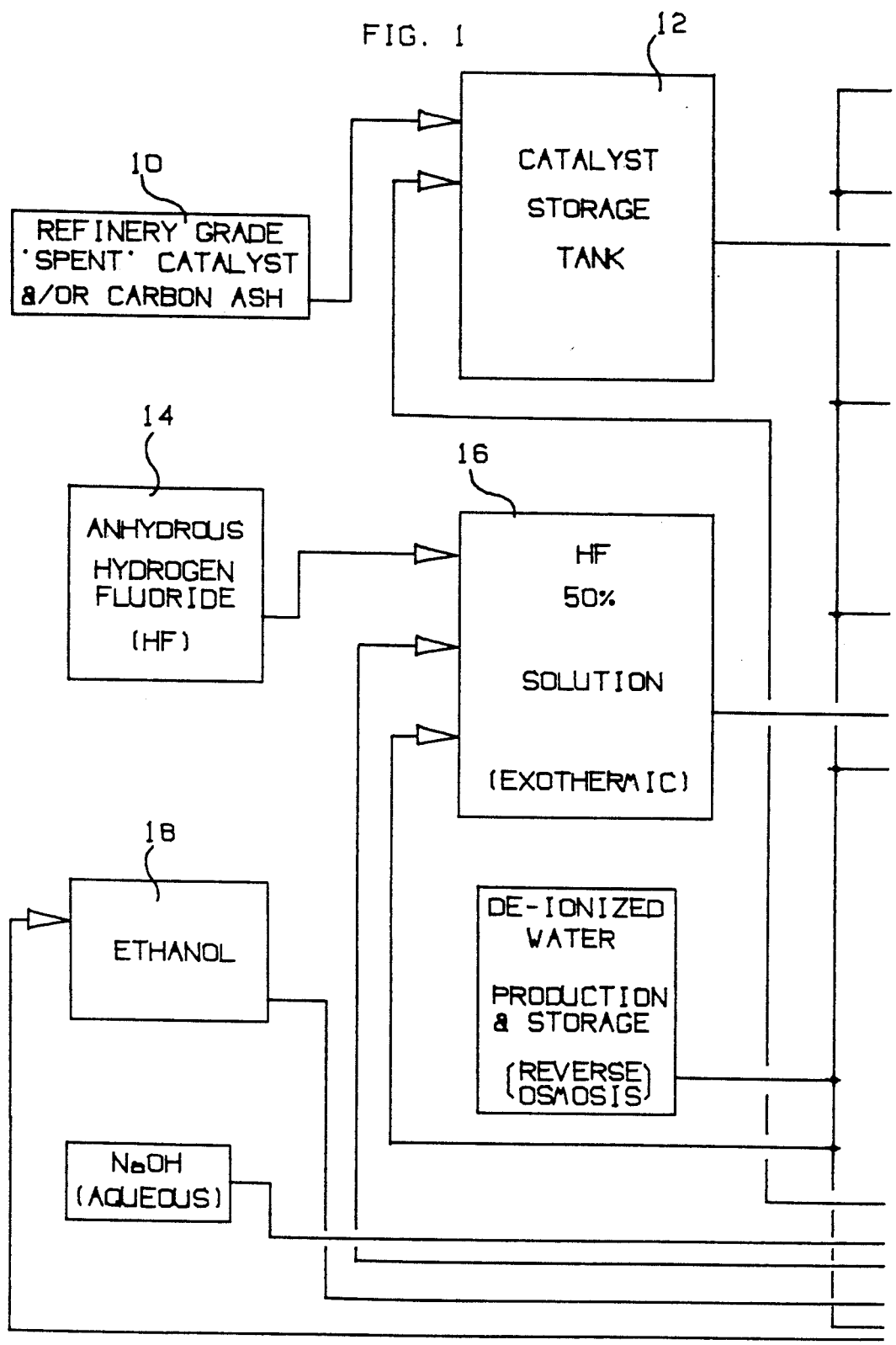
FIG. 1 is a schematic diagram illustrating the materials and initial steps of the process.
Figure 2:
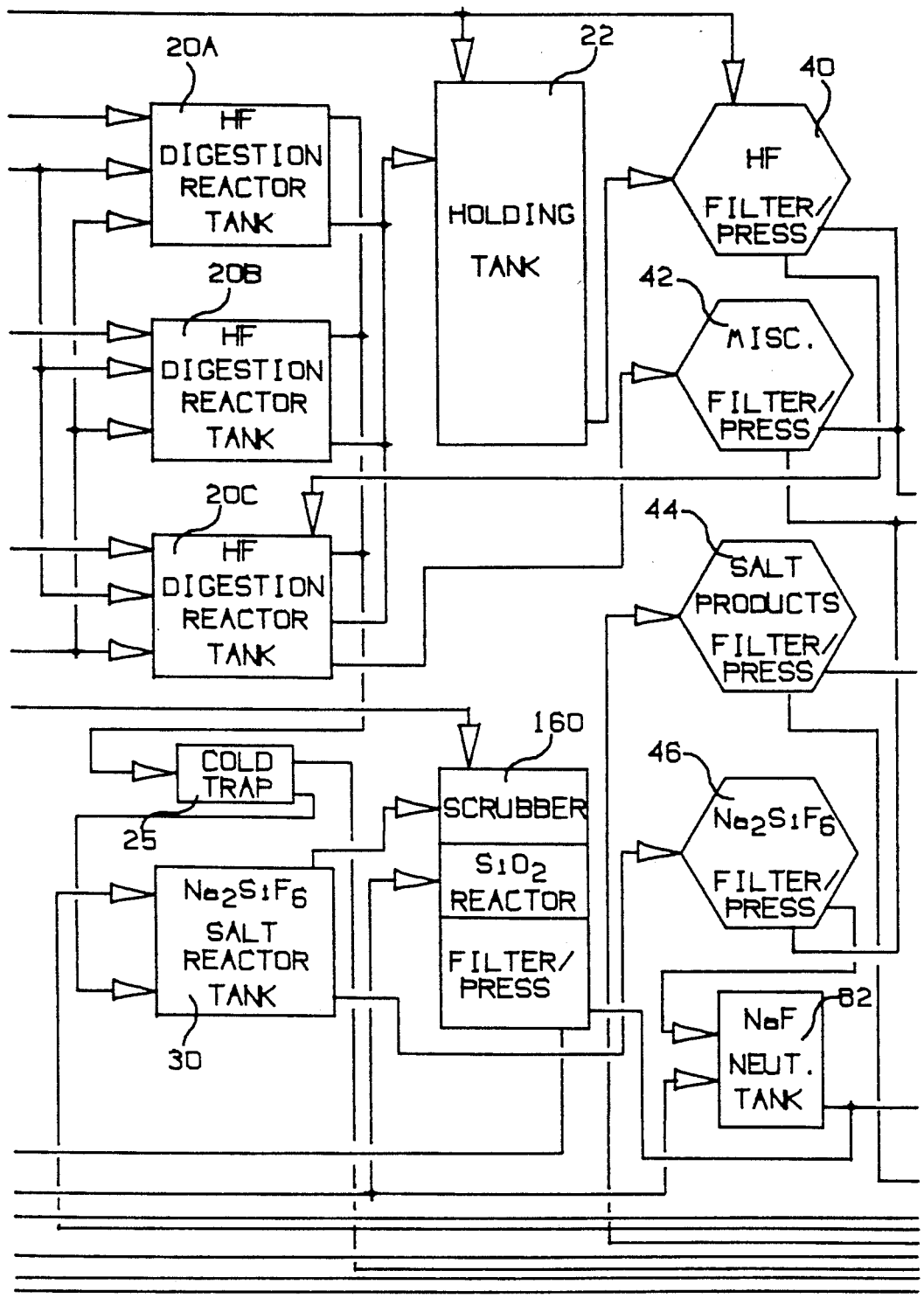
FIG. 2 is a schematic diagram illustrating the various digestion reactor tanks and additional processing of the materials.
Figure 3:
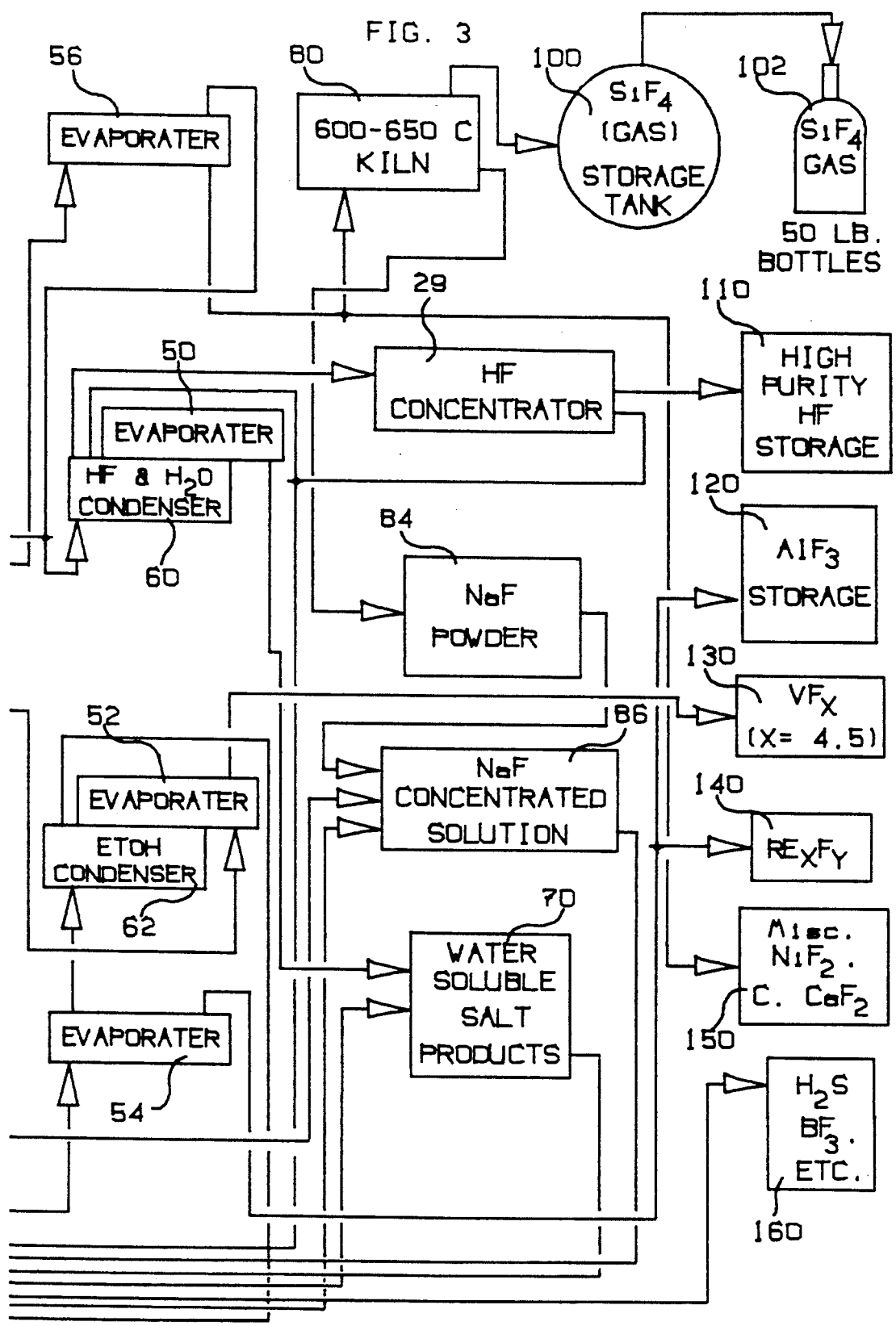
FIG. 3 is a schematic diagram illustrating the evaporators, condensers, kiln and additional processing of the materials including recovery of products.

The process for hydrofluoric acid digestion of silica/alumina matrix material for the production of silicon tetrafluoride and aluminum fluoride and other heavy metals involves the following general equations:

I. Separation silica/alumina matrix material as $SiF_{4(g)}$ and $AlF_3$:

$$SiO_2/Al_2O_3 + 10HF \rightarrow SiF_{4(g)} + 2AlF_{3(aq)} + 5H_2O$$

II. Purification of $SiF_4$ by addition of NaF in excess HF:

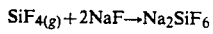

$$SiF_{4(g)} + 2NaF \rightarrow Na_2SiF_6$$

III. Regeneration of purified $SiF_{4(g)}$:

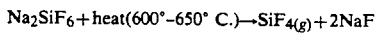

$$Na_2SiF_6 + heat(600°-650° C.) \rightarrow SiF_{4(g)} + 2NaF$$

IV. Recovery of $AlF_3$

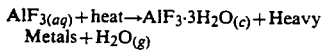

$$AlF_{3(aq)} + heat \rightarrow AlF_3 \cdot 3H_2O_{(c)} + Heavy\ Metals + H_2O_{(g)}$$

V. Separation of metal fluorides from $AlF_3$:

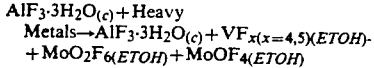

$$AlF_3 \cdot 3H_2O_{(c)} + Heavy\ Metals \rightarrow AlF_3 \cdot 3H_2O_{(c)} + VF_{x(x=4,5)(ETOH)} + MoO_2F_{6(ETOH)} + MoOF_{4(ETOH)}$$

The process starts with the chemical digestion of silica ($SiO_2$) / alumina ($Al_2O_3$) matrix material. The complimentary components that make up the remaining portion of the silica/alumina matrix material will be of concern later. The digestion of the silica/alumina matrix material is accomplished by the reaction set forth in equation I above. The raw material is reacted with aqueous hydrofluoric acid (HF) to produce two separate process paths; (a) the purification and utilization of silicon tetrafluoride ($SiF_4$) gas, and (b) the recovery of aluminum fluoride and the physical separation of the soluble and insoluble metal fluorides and oxides of aluminum (Al), nickel (Ni), Vanadium (V), rare earth metals (RE), titanium (Ti) etc. from one another.

SECTION I. SILICON TETRAFLOURIDE PROCESS PATH

When the silicon tetrafluoride is generated from equation I above it is a liberated gas which will need to be purified of contaminating gases. The generated silicon tetrafluoride gas for example may contain hydrogen fluoride (HF), hydrogen sulfide ($H_2S$), boron fluoride ($BF_3$), arsenic trifluoride ($AsF_3$), arsine ($H_3As$) phosphorus fluorides ($PF_3$ and $PF_5$), trace water vapor, and other gaseous fluorides depending upon the composition of the initial silica/alumina matrix raw material being digested. It is important to remove such contaminants out of the silicon tetrafluoride gas stream. This is accomplished initially by eliminating water vapor from the silicon tetrafluoride gas stream by allowing the equation I above to be worked at ambient temperature such that, even with the heat generated by the exothermic nature of the reaction, the entire reaction is kept under the temperature of 100° C. as to avoid water vapor as a major gaseous product. The process of the present invention also provides for purification of the generated silicon tetrafluoride gas stream by having the same through a series of cold traps that will remove the non-metal gaseous contaminants by condensation from the silicon tetrafluoride gas stream. Once the purified silicon tetrafluoride gas stream is obtained, residual hydrogen fluoride gas must be removed. To do this, the purified gas stream is introduced to a saturated aqueous sodium fluoride solution containing aqueous hydrogen fluoride in order to precipitate sodium fluorosilicate ($Na_2SiF_6$) in accordance with equation II above. The sodium fluorosilicate will then be filtered, dried, and heated between 600° and 650° C. in order to liberate purified silicon tetrafluoride ($SiF_4$) gas, as set forth in equation III above. The sodium fluoride is recycled back to the saturated solution. The purified silicon tetrafluoride may be sold directly to vendors, may be hydrolyzed to form fumed silica ($SiO_2$), or may be further reduced to produce silicon metal (Si) by known art processes such as that of U.S. Pat. No. 4,442,082, the specification of which is incorporated herein by reference, and/or the process described in the article entitled *Silicon by Sodium Reduction of Silicon Tetraflouride* of the Journal of the Electrochemical Society, Volume 128, No. 1, January 1981, the disclosure of which is also incorporated herein by reference.

SECTION II. METAL FLUORIDES AND OXIDES PROCESS PATH

The hydrofluoric acid digestion of silica/alumina matrix produces a silicon tetrafluoride gas stream and a solution/slurry containing aluminum fluoride, additional undigested oxides, and soluble and insoluble fluoride materials. Recovery of aluminum fluoride is obtained by washing the solution/slurry with water to completely dissolve all water soluble materials; separating all undissolved materials by a filter press and drying the remaining solution containing aluminum fluoride and other water soluble fluorides in an evaporator while condensing water and excess hydrofluoric acid vapors in a condenser; and recovering the aluminum fluoride trihydrate powder and/or heavy metal fluorides powder from the dried solution and/or collecting high purity hydrofluoric acid from the liquid condensate by fractional distillation.

The resulting digestion solution/slurry from equation I above will contain aluminum fluoride, other soluble and insoluble fluorides, and non-digested oxides. This solution is filtered in order to separate the soluble from the insoluble materials. The insoluble material is analyzed by standard instrumental means and its further processing determined by its chemical composition. For example, it may be appropriate to recover calcium fluoride, nickel fluoride, magnesium fluoride, lead fluoride, rare earth fluorides, titanium dioxide, or inorganic carbon. The physical separation of the soluble fluorides of aluminum (Al), and other metals will be accomplished mainly by varying sublimation properties and solubility in aqueous as well as non-aqueous solvents.

One example of a process path, but not the only one, leading to the physical separation of the soluble metal fluorides of vanadium and manganese proceeds generally in accordance with equation V above.

SECTION III. DIGESTION REACTION

Referring now to the drawings, and more particularly to FIG. 1, the initial delivery of the inorganic silica/alumina matrix material (powder) is accepted by delivery bin 10. From here the powder is pneumatically transferred to storage container 12. Hydrogen fluoride can be accepted in both anhydrous and concentrated aqueous form. Anhydrous hydrogen fluoride is accepted in tank 14 from conventional means of transportation and delivery. The anhydrous hydrogen fluoride is transferred into and diluted with water in tank 16 in order to produce an aqueous solution of 45% to 50% HF. Concentrated aqueous hydrogen fluoride is delivered directly to tank 16. The concentrated solution is then be pumped or gravity fed to one or more HF digestion reaction tanks 20A, 20B, 20C, etc.

The matrix powder of storage container 12 is then pneumatically transferred or gravity fed to the HF digestion reaction tanks 20A, 20B, 20C, etc. for admixture with aqueous hydrogen fluoride in multiples of, but not limited to, ten (10) pounds of inorganic $SiO_2/Al_2O_3$ matrix material to three (3) gallons (an excess amount) of concentrated hydrofluoric acid solution, and preferably in the amount of two hundred fifty (250) pounds of inorganic $SiO_2/Al_2O_3$ matrix material to seventy five (75) gallons of concentrated hydrofluoric acid solution so as to keep the exothermic nature of the reaction under 100° C. in temperature. The reaction goes to completion with the formation of two major products, silicon tetrafluoride ($SiF_4$) gas and a solution containing material such as aqueous aluminum fluoride ($AlF_3$) and insoluble calcium fluoride ($CaF_2$) in accordance with the following equation: $SiO_2/Al_2O_3 + CaO + 12HF_{(aq)} \rightarrow SiF_{4(g)} + 2AlF_{3(aq)} + CaF_{2(s)} + 6H_2O$. It is important to note that the above reaction begins at ambient temperature and standard pressure and that the exothermic nature of the reaction, although heating the solution, does not rise above 100° C. in temperature thus preventing the formation of excessive water vapor in admixture to the silicon tetrafluoride gas stream. Optimally, the temperature of the reaction will not rise above 80° C. in temperature; cooling jackets may be provided to the reaction vessel (i.e. HF digestion reactor tank(s) 20a, 20b, 20c etc.) to maintain reaction temperature less than 100° C. to avoid formation of water vapor. Introduction of water vapor in admixture to the silicon tetrafluoride gas stream would cause a reaction that would create HF and regenerate $SiO_2$.

Although the silicon tetrafluoride gas stream at this point in the reaction could contain impurities such as hydrogen sulfide ($H_2S$), boron fluoride ($BF_3$), arsine ($H_3As$), arsenic trifluoride ($AsF_3$), phosphorous fluorides ($PF_3$ and $PF_5$), and other gaseous fluorides, depending upon the composition of the raw material being digested, the silicon tetrafluoride and contaminant gasses are further processed for purification by pumping the gaseous stream from the HF digestion reaction tanks to one or more cold trap(s) 25 that will remove the contaminants by condensation from the silicon tetrafluoride gas stream. Preferably, the cold trap(s) 25 is a series of individual cold traps standard in the art along the flow line of the silicon tetrafluoride gas stream. For example, a first cold trap may be set to minus 60° C. to minus 85° C. to condense out hydrogen sulfide as a liquid, a second cold trap may be set to minus 85° C. to minus 100° C. to condense out phosphorus fluorides as a liquid, and a third cold trap may be set to minus 101° C. to minus 130° C. to condense out boron trifluoride as a liquid. Removing boron trifluoride from the silicon tetrafluoride gas stream is particularly critical as the presence of boron in excess of ten parts per billion will hamper the semi-conductor property of the silicon metal end product. Other cold traps could be provided to condense out other contaminant gasses in admixture to the generated silicon tetrafluoride gas stream as liquid impurities in a manner known in the art. The purified silicon tetrafluoride gas is then pumped into the sodium fluorosilicate ($Na_2SiF_6$) salt reactor tank 30, and processed according to Section V below. The remaining solutions in the hydrogen fluoride digestion reactor tanks 20A, 20B, 20C, etc. are pumped, along with additional water from 17 into solution tank 22. A sufficient amount of additional water from 17 is then pumped into holding tank 22 to completely dissolve all water soluble materials for processing according to Section IV below.

SECTION IV. PROCESS SEPARATION OF SOLUBLE FROM INSOLUBLE MATERIALS

After enough water is added to the holding tank 22 to insure all of the water soluble salts have dissolved, mainly the aluminum fluoride, the solution/slurry is pumped to a filter press 40 for filtration. This removes all undigested and insoluble materials from the solution. The undigested oxides and insoluble fluoride materials that may be present, and further processed according to Section IVA below, include, but are not limited to, calcium fluoride ($CaF_2$), nickel fluoride ($NiF_2$), inorganic carbon (C), titanium dioxide ($TiO_2$), magnesium fluoride ($MgF_2$), and lead fluoride ($PbF_2$), and rare earth fluorides ($RE_xF_y$) The resulting solution is pumped to evaporator 50 and dried. The dried powder (aluminum fluoride trihydrate) is conveyed to a storage container 70 and further processed according to Section IVB below, while the water and excess hydrogen fluoride vapors are condensed in condenser 60. The liquid condensate is collected by fractional distillation to allow the separation of concentrated hydrogen fluoride solution from excess water. The aqueous hydrogen fluoride solution is pumped into the hydrogen fluoride concentrator 29, while the remaining condensate is pumped back into the concentrated hydrogen fluoride solution tank 16 for recycling. The concentrator 29 further removes excess water, which is also pumped to the hydrogen fluoride solution tank 16, so that high purity concentrated aqueous hydrogen fluoride is pumped to storage vessel 110.

SECTION IVA. FURTHER PROCESSING OF UNDIGESTED AND INSOLUBLE MATERIALS

The undigested oxides and insoluble fluoride materials such as calcium fluoride ($CaF_2$), nickel fluoride ($NiF_2$), inorganic carbon (C), titanium dioxide ($TiO_2$), magnesium fluoride ($MgF_2$), lead fluoride ($PbF_2$), and rare earth fluorides ($RE_xF_y$) are preferably conveyed from the filterpress 40 into the hydrogen fluoride digestion reactor 20C to again be exposed to the hydrogen fluoride digestion process to insure complete hydrogen fluoride digestion. After two or three cycles in this above manner the resulting solution/slurry is pumped from solution tank 22 for filtration by filter/press 42. The separated undigested and insoluble material from filter/press 42 is conveyed to and dried in evaporator 56 while the vapors are collected in condenser 60. The dried powder is then conveyed to storage container 150 where later analysis and identification of the dried powder by standard instrumental means known in the art can be made in order to evaluate its value for further processing or proper environmental disposal. The solution from filter/press 42 is transferred to an evaporator 50 for further processing as stated above.

SECTION IVB. FURTHER PROCESSING OF THE SOLUBLE SALTS

Depending on the chemical composition of the obtained water soluble salts from the HF digestion of the silica/alumina matrix, further separation of other metal fluorides is possible. An illustrative example, but not the only one, is the recovery of vanadium fluorides ($VF_4$ and $VF_5$) and molybdenum oxyfluorides ($MoO_2F_2$ and $MoOF_4$). This is accomplished by extraction of the obtained dried soluble salt, namely aluminum fluoride trihydrate, stored in container 70 with ethyl alcohol ($CH_3CH_2OH$, ethanol,or ETOH). The ethanol is pumped into container 70, or a similar holding tank, and the resulting slurry is pumped to filter/press 44 for filtration to separate the ETOH insoluble materials from the solution. The resulting ETOH solution from press 44 is pumped to and distilled by evaporator 52 to yield in combination the vanadium fluorides salts and molybdenum oxyfluorides and ETOH vapor. The combined salts are conveyed to and stored in container 130 for further processing which will include separation by standard sublimation techniques while the ETOH vapors are collected by a condenser 62. The ETOH condensate is pumped for recycling back into the ETOH storage vessel 18.

Some other examples of potential soluble metal fluoride materials which may be present, in concentrations great enough to allow for their further separation, include, but are not limited to, sodium fluoride (NaF), potassium fluoride (KF), and iron fluoride ($FeF_3$). These may be removed prior to dehydration in kiln 82 by water washing the water insoluble aluminum trifluoride trihydrate salt from evaporator 54.

The insoluble material from the filter/press 44 is conveyed to and dried in an evaporator 54, while the residual ETOH vapor products are fed into a condenser 62 and processed as above. The resulting dried powder is then conveyed to kiln 82 and heated to 400° C. to 700° C., preferably 600° C., for dehydration and to also evolve all low temperature sublimation products. This heating will produce a purified aluminum fluoride anhydrous salt which is recovered from kiln 82 and conveyed to storage vessel 120. The sublimation products are pumped or conveyed to storage bin 140 for further processing.

SECTION V. PROCESS PURIFICATION OF SILICON TETRAFLUORIDE

In the sodium fluorosilicate reactor tank 30, the HF digestion reactor produced $SiF_4$ combines with aqueous sodium fluoride (NaF) and aqueous hydrogen fluoride to form a slightly soluble sodium fluorosilicate ($Na_2SiF_6$) salt. This solution/slurry is pumped to and filtered by filter/press 46. The sodium fluorosilicate powder is conveyed to and dried in evaporator 56, and the resulting powder is then conveyed to a rotary kiln 80 while the resulting solution of excess aqueous HF and NaF is processed in either of two ways: (1) the solution can be pumped into and neutralized in neutralization tank 82 with an aqueous caustic such as, but not limited to, sodium hydroxide (NaOH) from 19, and thereafter the neutralized solution is pumped into the NaF concentrated solution vessel 86; or (2) the solution can be dried in evaporator 50 with salts being conveyed to storage bin 84 while the water and hydrogen fluoride vapors are condensed by condenser 60 and processed as above.

The kiln 80 reaction temperature preferably ranges between, but is not limited to, 600° C. and 650° C. to generate pure $SiF_4$ gas and NaF powder. The $SiF_4$ gas is collected is substantially pure and is stored as a solid at liquid nitrogen temperatures or as a pressurized gas for further processing via storage tanks 100 and/or bottles 102, respectively, while the NaF salt is conveyed to storage vessel 84.

The NaF concentrated solution 86 is saturated with additional NaF powder produced as a kiln 80 decomposition product from storage vessel 84. This saturated solution is then pumped into the sodium fluorosilicate reaction tank (vessel 30) and allowed to react with a supply of $SiF_4$ and HF gases from the HF digestion reactor 20A, 20B, 20C.

SECTION VI. EXAMPLES

TABLE 1

| FCCU Material wt. used | 50% HF used | % residual solids | HF digested soluble material |
|---|---|---|---|
| A. 14.14 g | 34.95 g | 3.2 | 19.51 g |
| B. 13.45 g | 37.17 g | 5.0 | 18.89 g |

| Loss on Ignition | % $AlF_3$ in ignited soluble solids | Weight of $SiF_4$ produced (calculated) |
|---|---|---|
| A. 42.5 | 99.2 | 12.1 g |
| B. 40.2 | 93.8 | 11.7 g |

Table 1 reflects the results of a lab bench experiment conducted generally in accordance to the process of the present invention on two separate and differently composed samples of FCCU waste materials. The lab bench experiment did not purify the silicon tetrafluoride gas stream generated from the matrix material reaction with aqueous hydrofluoric acid by use of cold traps. Sample A weighed 14.14 grams and when reacted with 34.95 grams of aqueous HF produced a percentage of nondigested residual solids of 3.2%. The weight of the HF reacted soluble materials was 19.51 grams of which 42.5% represents gases evolved on ignition for 3 hours at 600° C. The purity of aluminum fluoride recovered was 99.2% pure. The amount of silicon tetrafluoride gas (calculated from weight) was 12.1 grams. An analysis of the residual solids from the sample A FCCU matrix material revealed a composition of 50% titanium oxide, 28% calcium fluoride, 8% magnesium fluoride, 5% carbon, 4% iron oxide and 5% of undetermined material.

Sample B represents FCCU waste material having similar silica/alumina content but, as it came from a different crude, the presence of other component materials affected the values of products obtained. Sample B weighed 13.45 grams and when reacted with 37.17 grams of aqueous HF produced a percentage of non-digested solids of 5.0 percent. The weight of the HF reacted soluble materials was 18.89 grams of which 40.2 percent represents gases evolved for 3 hours at 600° C. on ignition. The purity of aluminum fluoride recovered was 93.8 percent pure. The amount of silicon tetrafluoride gas (calculated from weight) was 11.7 grams. The percentage of silica in the silica/alumina matrix material remains fairly constant within the range of 50% to 70% for FCCU material.

TABLE 2

| CCBP Material wt. used | 50% HF used | % residual solids | HF digested soluble material |
|---|---|---|---|
| A. 13.50 g | 24.67 g | 46.4 | 6.42 g |
| B. 12.70 g | 28.29 g | 34.3 | 7.32 g |

| Loss on Ignition | % AlF$_3$ in ignited soluble solids | Weight of SiF$_4$ produced (calculated) | |
|---|---|---|---|
| A. 42.0 | 85.7 | 9.36 g | |
| B. 45.0 | 89.7 | 9.90 g | |

Table 2 reflects the results of a lab bench experiment conducted generally in accordance to the process of the present invention on two separate and differently composed samples of CCBP waste materials. This lab bench experiment also did not purify the silicon tetrafluoride gas stream generated from the matrix material reaction with aqueous hydrofluoric acid by use of cold traps. Sample A weighed 13.50 grams and when reacted with 24.67 grams of aqueous HF produced a percentage of nondigested residual solids of 46.4%. The weight of the HF reacted soluble materials was 6.42 grams of which 42.0% represents gases evolved on ignition for 3 hours at 600° C. The purity of aluminum fluoride recovered was 85.7 pure. The amount of silicon tetrafluoride gas (calculated from weight) was 9.36 grams.

Sample B represents CCBP waste material having similar silica/alumina content but, as it came from a different power plant waste product, the presence of other component materials affected the values of products obtained. Sample B weighed 12.70 grams and when reacted with 28.29 grams of HF produced a percentage of non-digested solids of 34.3 percent. The weight of the HF reacted soluble materials was 7.32 grams of which 45.0 percent represents gases evolved for 3 hours at 600° C. on ignition. The purity of aluminum fluoride recovered was 89.7 percent pure. The amount of silicon tetrafluoride gas (calculated from weight) was 9.90 grams.

I claim:

1. A process for hydrofluoric acid digestion of silica/alumina matrix material for the production of silicon tetrafluoride which comprises:
    (a) reacting inorganic silica/alumina matrix material with hydrofluoric acid to produce silicon tetrafluoride gas;
    (b) purifying said silicon tetrafluoride gas by condensation removal of contaminants in one or more cold trap(s); and
    (c) reacting the purified silicon tetrafluoride gas of step (b) above with aqueous sodium fluoride to form a solution/slurry of fluorosilicate salt;
    (d) delivering said solution/slurry of step (c) above to a filter press to separate sodium fluorosilicate powder from said solution/slurry;
    (e) drying and then introducing said sodium fluorosilicate powder to a kiln at a temperature of about 600° C. to 650° C. to form silicon tetrafluoride gas and sodium fluoride powder;
    (f) collecting said silicon tetrafluoride gas and/or said sodium fluoride powder of step (e) above.

2. A process for hydrofluoric acid digestion of silica/alumina matrix material for the production of aluminum fluoride which comprises:
    (a) reacting inorganic silica/alumina matrix material with hydrofluoric acid to produce a solution/slurry containing aluminum fluoride, undigested oxides, and additional soluble and insoluble fluoride materials;
    (b) washing the solution/slurry containing aluminum fluoride, undigested oxides and additional soluble and insoluble fluoride materials of step (a) above with water to completely dissolve all water soluble materials;
    (c) separating all undissolved materials of step (b) above by a filter press and drying the remaining solution containing aluminum fluoride and other water soluble fluorides in an evaporator;
    (d) recovering aluminum fluoride trihydrate powder and/or heavy metal fluorides powder from the dried solution of step (c) above.

3. The process according to claim 2 further comprising:
    (e) condensing for recovery aqueous hydrofluoric acid in a condenser during the evaporation of step (c) above.

4. The process according to claim 2 wherein the undissolved materials separated by a filter press of step (c) is recycled to the hydrofluoric acid digestion of silica/alumina matrix material reaction.

5. The process of claim 2 wherein the undissolved materials separated by a filter press of step (c) is dried in an evaporator and collected for storage or separation.

6. The process according to claim 5 above wherein the collected material includes calcium fluoride, nickel fluoride, inorganic carbon, titanium dioxide, magnesium fluoride, lead fluoride, or rare earth fluorides.

7. The process of claim 2 further comprising the following steps:
    (f) leaching the aluminum fluoride trihydrate powder and/or heavy metal fluorides powder from step (d) with ethyl alcohol to form a solution/slurry;
    (g) delivering said solution/slurry of step (f) to a filter press to separate insoluble material;
    (h) drying the resulting solution from the filtration of step (g) in an evaporator to yield ethyl alcohol soluble salt or salts for collection and/or drying the insoluble material from the filtration of step (g) in an evaporator to separate and collect the water soluble salt or salts from the aluminum fluoride trihydrate.

8. The process of claim 7 above wherein the water soluble salt or salts separated and collected in step (h)

comprise sodium fluoride, potassium fluoride, or iron fluoride.

9. The process of claim 7 above wherein the ethyl alcohol soluble salt or salts collected in step (h) comprise a vanadium fluoride or a molybdenum oxyfluoride.

10. The process according to claim 1 wherein the silica/alumina matrix material comprises silica/alumina zeolytes or fly ash or slags or bottom ash.

11. The process according to claim 2 wherein the silica/alumina matrix material comprises silica/alumina zeolytes or fly ash or slags or bottom ash.

12. The process according to claim 1 wherein the reaction of inorganic silica/alumina matrix material with hydrofluoric acid proceeds at a temperature of less than 100° C.

13. The process according to claim 12 wherein the reaction of inorganic silica/alumina matrix material with hydrofluoric acid proceeds at a temperature of 80° C. or less by use of cooling jackets to the reaction vessel.

* * * * *